Figure 1:
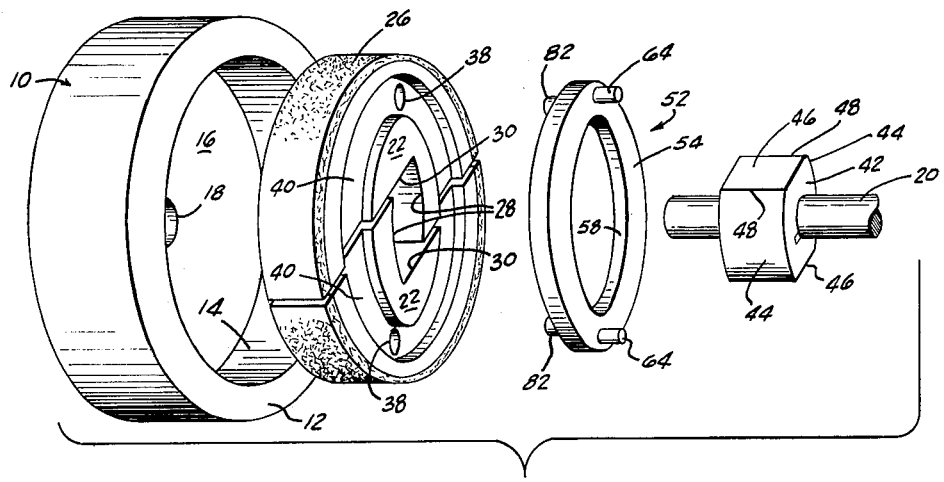

July 19, 1966  C. H. KRAMM  3,261,437

OVERRUNNING CLUTCH

Filed July 27, 1964　　　　　　　　　　　　　　　　2 Sheets-Sheet 1

INVENTOR
CARL H. KRAMM
BY Beaman & Beaman
ATTORNEYS

July 19, 1966   C. H. KRAMM   3,261,437
OVERRUNNING CLUTCH

Filed July 27, 1964   2 Sheets-Sheet 2

INVENTOR
CARL H. KRAMM
BY Beaman & Beaman
ATTORNEYS

United States Patent Office 3,261,437
Patented July 19, 1966

3,261,437
OVERRUNNING CLUTCH
Carl H. Kramm, 5747 E. Coon Lake Road,
Howell, Mich.
Filed July 27, 1964, Ser. No. 385,307
5 Claims. (Cl. 192—41)

The invention pertains to an overrunning clutch, and particularly relates to an overrunning clutch capable of having overrunning features in either direction of rotation of the drive member.

Overrunning clutches are known in the clutch art wherein the driven member is capable of automatically disengaging from the clutch drive components when the rotation of the driven member attains a rotational velocity greater than that of the drive components. Ratchet means and other types of unidirectional clutching members, such as Sprague clutches, and the like, have long been used for this purpose. However, overrunning clutch assemblies having overrunning features in either direction of rotation of the drive member are not available, and it is to this particular type of clutch that the invention is directed. Such a clutch has a variety of uses and would be of advantage as used in the four-wheel drive vehicle art wherein front-wheel drive mechanisms are desired.

A basic object of the invention is to provide an overrunning clutch mechanism wherein overrunning operation of the driven member occurs during either direction of rotation of the drive member and the clutch assembly.

Another object of the invention is to provide an overrunning clutch assembly wherein the drive components frictionally engage with the driven member regardless of the direction of rotation of the drive member and the "clutching" of the clutch components occurs upon a minimum amount of rotation of the drive member.

A further object of the invention is to provide an overrunning clutch assembly which is of an economical and sturdy configuration and wherein a dependable interconnection is produced between the drive and driven members whereby the efficiency of the interconnection between the drive and driven members increases as the torque requirements imposed on the clutch assembly increase.

A further object of the invention is to provide an overrunning clutch assembly wherein friction drag means are employed to insure operation of the clutch components upon occurrence of a minimum angular rotation of the drive member.

A further object of the invention is to provide an overrunning clutch arrangement employing drag means with the rotative components to assure operation of the clutch components at low operating velocities. However, as the rotational velocities increase, the frictional characteristics of the drag means decrease.

Figure 2:
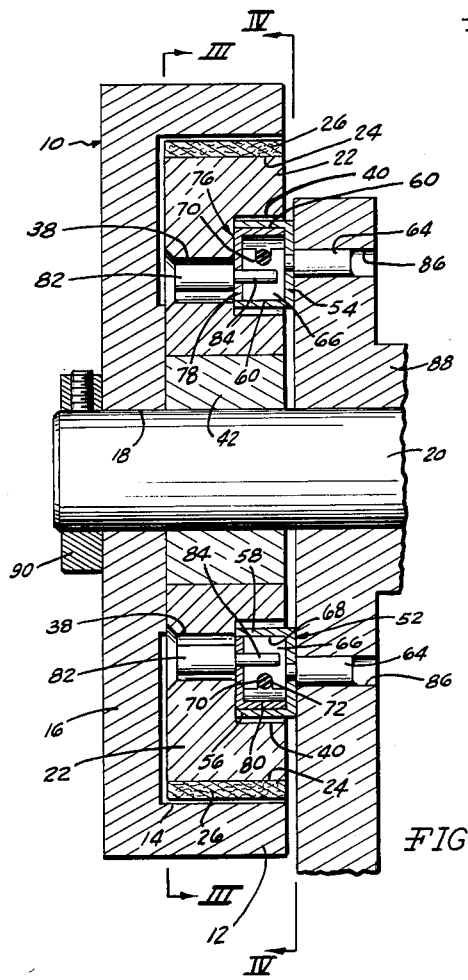
Figure 3:
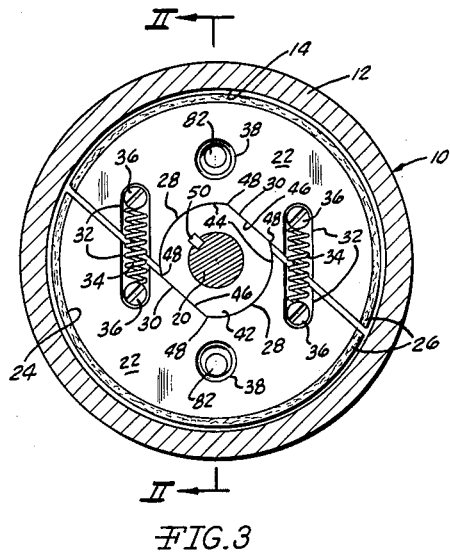
Figure 4:
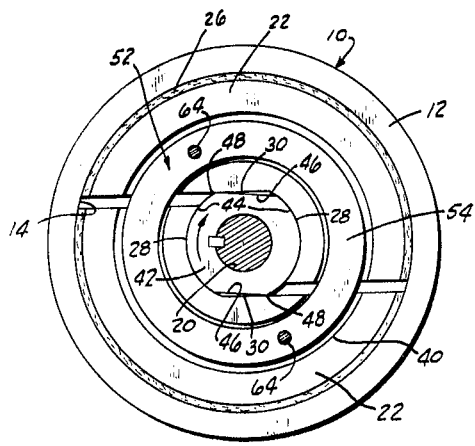
Figure 5:
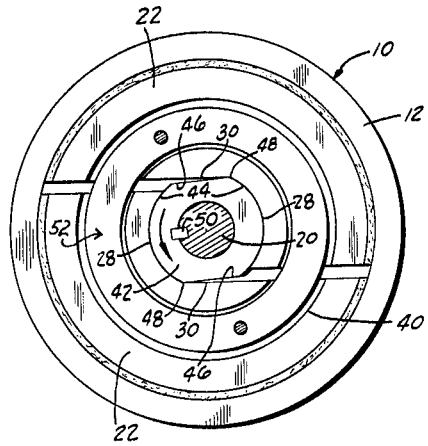
Figure 6:
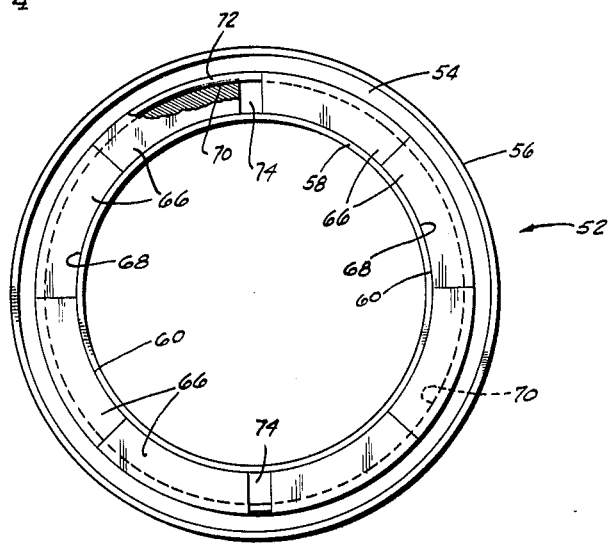

These and other objects of the invention arising from the details and relationships of the components and an embodiment thereof will be apparent from the following description and accompanying drawings wherein:

FIG. 1 is an exploded, perspective view of the basic components of a clutch assembly in accord with the invention, FIG. 2 is a diametrical, sectional, elevational view of a clutch assembly in accord with the invention as taken along section II—II of FIG. 3, FIG. 3 is an elevational, sectional view of the clutch assembly of FIG. 2 as taken along section III—III thereof, FIGS. 4 and 5 are elevational, sectional views of the clutch assembly as taken along section IV—IV of FIG. 2 illustrating the components of the assembly during clutching and rotation of the drive member in opposite directions of rotation, the direction of rotation of the drive member being illustrated by the arrows, and FIG. 6 is a detail, elevational view of the annular cup-shaped drag ring illustrating the arcuate segments and annular spring in position therein, a portion of one of the segments being broken away to illustrate the spring.

The basic components of an overrunning clutch assembly in accord with the invention are illustrated in FIG. 1. The driven member, which is in the form of a drum, is indicated at 10, and is preferably of a cylindrical construction having an annular wall 12 including an inner cylindrical wall surface 14. The radial wall portion 16 of the drum is provided with a central hole 18 for receiving the drive shaft 20, as will be apparent in FIG. 2. Torque forces are transmitted to the drum 10 by means of a pair of friction elements 22 in the form of shoes. The elements 12 are each provided with an exterior, cylindrical surface portion 24 on which is bonded, or otherwise affixed, a friction material 26 such as that similar to brake lining or the like. The elements 22 are of a somewhat L-shaped configuration, as will be apparent from FIGS. 3, 4 and 5. Each of the elements 22 is provided with a cam surface which is formed by the concave, cylindrical segment portion 28 intersected by a planar surface 30. On one side of the elements 22 recesses 32 are defined theerin for receiving springs 34 interposed between the elements. The recesses 32 are of sufficient depth to completely receive the springs 34, and screws 36 within the recesses serve as anchors for the springs.

A hole 38 is defined in each of the elements 22 so that during the assembly the holes 38 will be in diametrically opposed relation. The sides of the elements 22 opposite to that in which the spring-receiving recesses 32 are formed are provided with a groove 40, FIGS. 1 and 2, which is intersected by a hole 38. The annular groove 40 is concentric to the general configuration of the associated element 22 whereby upon assembly of the elements a continuous circular groove will result.

The drive member, as shown, is in the form of a cam 42. The cam 42 includes a pair of diametrically opposed, convex, cylindrical portions 44,and is of an oblong configuration due to the provision of a pair of diametrically related flats, or planar portions 46, which are disposed parallel to each other and intersect the cylindrical portions 44 at ridges 48. The cam 42 is affixed to the drive shaft 20 by a key 50, FIG. 3, or may be made integral with the drive shaft, if desired.

To assure proper operation of the clutch components, particularly at low angular velocity rotation and low torque requirements, a brake or friction drag device is provided with the elements 22 to resist their rotation and thereby assure proper operation of the elements by the cam 42. In the disclosed embodiment, the drag device 52 includes an annular cup 54 having a pair of axially extending, cylindrical, concentric walls, FIG. 2. The wall 56 constitutes an outer wall and the wall 58 constitutes an inner wall having a cylindrical surface 60. The radial portion of the cup 54 is provided with a pair of axially extending pins 64 adapted to be affixed to relative stationary structure.

As will be apparent from FIG. 6, a plurality of friction segments 66 are located intermediate the walls 56 and 58. The segments 66 are of a concave-convex configuration, having an inner concave, cylindrical surface 68 which conforms to the configuration of the outer surface 60 of the inner wall 58. The outer periphery of the segments 66 is provided with a groove 70 in which an annular spring member 72 may be received to bias and radially contract the segments 66 into frictional engagement with the cup surface 60. The spring 72 may consist of a resilient O-ring or a steel coil spring. As will be noted from FIG. 6, the circumferential length of the segments 66 is such that a pair of diametrically opposed gaps 74 exist between the segments of the assembly.

A segment retainer 76 of an annular configuration is provided having a radial portion 78 and an outer cylindrical flange portion 80 adapted to be disposed adjacent the cup wall 56, FIG. 2. The retainer 76 is provided with a pair of axially extending studs 82 adapted to be loosely received within the holes 38. Also, the studs 82 include projections 84 which extend within the cup 54 and are adapted to be received within the segment gaps 74. In this manner the projections 84 interconnect the friction segments 66 to the retainer 76 for rotation therewith. It is to be noted that the radial width dimension of the elements' groove 40 is greater than the radial width dimension of the cup 54 whereby radial expansion of the elements 22 is possible without interference from the friction drag device 52. It is for this reason that the studs 82 are loosely received within the holes 38.

As shown in FIG. 1, the cup pins 64 may be received within holes 86 defined in member 88 which is stationary with respect to the clutch assembly. The member 88 may constitute a differential casing of a vehicle power transmission system, for instance.

The components of the clutch assembly are assembled in the relationship which will be apparent from FIG. 2. The drum 10 is rotatably mounted on the shaft 20 and retained thereon by a retaining collar 90 affixed thereto by a setscrew, or the like. Of course, the drum 10 may be separately mounted on bearing means, if desired. Regardless of the particular support of the drum 10, the axis of rotation thereof will be coincident with the axis of the shaft 20. The cam 42 is axially aligned with the drum surface 14 and the elements 22 are interposed in axial alignment between the cam and the drum surface 14. The friction drag device 52 is received within the elements' groove 40 and the cup 54 fixed relative to the clutch assembly, in that the pins 64 are received within holes 86. The segment retainer 76 is mounted for rotation with the elements 22 by means of the reception of the studs 82 within the element holes 38.

In the normal condition of the clutch assembly, the components will be as shown in FIG. 3. The biasing force imposed by the springs 34 tends to radially contract the elements 22 wherein the cam surface cylindrical portions 28 contiguously engage the cam cylindrical portions 44. Also, the planar cam surface portions 30 engage the cam planar portions 46 disposed adjacent thereto. As will be noted in FIG. 3, the studs 82 are off-center with respect to the holes 38 whereby maximum radial expansion of the elements 22 is permitted before interference of the studs with the holes occurs. In the declutched, or normal position, shown in FIG. 3, the contracted condition of the elements 22 withdraws the element friction material 26 from engagement with the drum surface 14 and, thus, no power transmitting connection occurs between the elements 22 and the drum 14. Upon rotation of the drive shaft 20 and the cam 42, two of the cam ridges 48 engage the cam surface planar portions 30 of the elements 22, the particular ridges engaging the element cam surfaces 30 depending on the direction of rotation of the cam. With reference to FIG. 4, wherein the cam is rotating in a clockwise direction as viewed, the upper left and lower right cam ridges will be engaging the element planar cam surfaces 30. The engagement of the ridges 48 with the element cam surfaces 30 tends to simultaneously rotate the elements 20 and also separates the elements in a radially expanding direction. As the radial expansion of the elements 22 is resisted by the springs 34, it is possible that sufficient radial expansion of the elements would not occur to establish a driving connection with the drum 10 unless means were provided to sufficiently restrain rotation of the elements 22 until an expanding action occurs between the cam 42 and the cam surfaces 30 to force the elements' friction material 26 into engagement with the drum surface 14. The friction drag device provides the necessary resistance to rotation of the elements 22 to permit the expanding action to take place and firmly lock the elements 22 into engagement with the drum surface 14.

As the cam 42 begins rotating, the resultant tendency for the elements 22 to rotate is transferred to the friction segments 66 through the projections 84. The frictional engagement of the segments' concave, cylindrical surfaces 68 with the stationary cup wall cylindrical surface 60 provides the frictional drag on the elements 22 necessary to produce the above described expanding action between the elements and the drum. As the elements 22 are resisting rotation due to the frictional drag produced by the drag device 52, the ridges 48 will sufficiently bias the elements 22 outwardly whereby an intimate engagement occurs between the element frictional material and the drum. Upon sufficient engagement with the drum, the elements 22 will be locked thereto and the greater the torque requirements necessary to turn the drum 10, the tighter the elements 22 will be forced into engagement with the drum, and a positive driving interconnection between the elements 22 and the drum 10 will result.

When the cam 42 and shaft 20 are rotating in the direction indicated in FIG. 4, the drum 10 will be driven in a clockwise direction. Should the velocity of rotation of the drum 10 become greater than that occurring due to the driving thereby by the shaft 20 and cam 42, the elements 22 will be rotated clockwise relative to the cam 42 wherein the planar element cam surface portions 30 tend to become parallel with the cam surfaces 46. Such a relationship permits the springs 34 to contract the elements 22 and, thus, disengage the elements 22 from the drum 14 to produce an overrunning effect permitting the drum to freely rotate in the same direction as the shaft 20.

One of the advantages of the described embodiment of the friction drag device 52 lies in the fact that the higher the rotative velocities of the elements 22, the less will be the frictional drag imposed on the elements 22 by the segments 66. The reduction in frictional engagement between the segments 66 and the cup wall 52 occurs due to the centrifugal forces imposed on the segments tending to raise the segments from the cup wall against the biasing force of spring 72 and thereby reduce the frictional engagement therewith.

FIG. 5 illustrates the relationship between the clutch components wherein the shaft 20 and cam 42 are rotating in the counterclockwise direction and a driving connection has been established with the drum to also rotate the drum in the counterclockwise direction. The principle of operation when the shaft is rotating in the couterclockwise direction is identical to that previously described with respect to the clockwise direction of FIG. 4, and an overrunnig effect will be produced should the velocity of the drum rotation in the counterclockwise direction become greater than that being produced by the shaft and cam. Thus, it will be appreciated that the clutch assembly of the invention provides an overrunning effect in either direction or rotation of the drive member.

As the force imposed by the cam 42 radially expanding the elements 22 increases proportionately to the torque being transmitted through the elements to the drum 10, it will be appreciated that the clutch assembly is self-energizing and is capable of transmitting very high torques without adversely affecting the overrunning characteristics. It is to be noted that the amount of radial expansion of the elements 22 between the "clutched" and "declutched" positions is quite small and that the radial expansion of the elements 22 required occurs with only a small degree of rotation of the cam 42. Also, the "engagement" of the clutch occurs within a small degree of rotation of the cam, in that the drag device 52 will always be in operation and will resist any initial tendency for the elements 22 to rotate. Thus, the engagement of the clutch is not dependent upon a high cam and shaft velocity but will ocur at very low rotational speeds.

It is appreciated that the inventive concepts may be incorporated into other embodiments than that shown, and it is intended that the invention be defined only by the scope of the following claims.

I claim:
1. An overrunning clutch assembly comprising, in combination,
   (a) a rotatable drive member adapted to rotate about a given axis,
   (b) a drum having an integral cylindrical surface,
   (c) means rotatably supporting said drum for rotation about said given axis,
   (d) a noncylindrical cam mounted upon said drive member for rotation therewith and axially aligned with said drum cylindrical surface,
   (e) a pair of radially movable friction elements interposed between said cam and said drum cylindrical surface, said elements being related in diametrical opposition with respect to each other and said cam, cylindrical segment surfaces defined on said elements adapted to selectively, frictionally engage said drum cylindrical surface,
   (f) a cam surface defined on each of said elements engaged by said cam whereby relative rotational movement between said cam and said elements radially translates said elements,
   (g) a cylindrical ring supported concentrically to said given axis and having an outer surface,
   (h) a plurality of arcuate friction-producing segments engaging said cylindrical ring outer surface and having a complementary concave, cylindrical surface defined thereon,
   (i) an annular spring biasing said segments into engagaement with said ring, and
   (j) means interconnecting said segments to said elements for rotation therewith.

2. An overrunning clutch assembly comprising, in combination,
   (a) a rotatable drive member adapted to rotate about a given axis,
   (b) a drum having an internal cylindrical surface,
   (c) means rotatably supporting said drum for rotation about said given axis,
   (d) a noncylindrical cam mounted upon said drive member for rotation therewith and axially aligned with said drum cylindrical surface,
   (e) a pair of radially movable friction elements interposed between said cam and said drum cylindrical surface, said elements being rotated in diametrical opposition with respect to each other and said cam, cylindrical segment surfaces defined on said elements adapted to selectively, frictionally engage said drum cylindrical surface,
   (f) a cam surface defined on each of said elements engaged by said cam whereby relative rotational movement between said cam and said elements radially translates said elements,
   (g) an annular recess defined in said elements concentric to said given axis, and
   (h) a friction drag received within said recess, said drag including an annular cup including a pair of spaced, parallel, axially extending inner and outer cylindrical walls, means supporting said cup concentric to said given axis, a plurality of segments within said cup intermediate said walls, a spring biasing said segments into engagement with said inner wall, an annular segment retainer mounted on said elements and received intermediate said walls and segment drive means extending from said retainer engaging said segments adapted to rotate said segments with said elements.

3. An overrunning clutch assembly comprising, in combination,
   (a) a rotatable drive member adapted to rotate about a given axis,
   (b) a drum having an internal cylindrical surface,
   (c) means rotatably supporting said drum for rotation about said given axis,
   (d) a noncylindrical cam mounted upon said drive member for rotation therewith and axially aligned with said drum cylindrical surface, said cam including diametrically related cylindrical portions and parallel, diametrically related, planar portions, the intersection of said planar and cylindrical portions defining ridges,
   (e) a pair of radially movable friction elements interposed between said cam and said cam drum cylindrical surface, said elements being related in diametrical opposition with respect to each other and said cam, cylindrical segment surfaces defined on said elements adapted to selectively, frictionally engage said drum cylindrical surface,
   (f) a cam surface defined on each of said elements, said cam surfaces each including a concave, cylindrical segment complementary to a cam cylindrical portion and a planar portion intersecting said concave, cylindrical portion, said cam ridges engaging said cam surface planar portions upon the occurrence of relative rotation of said cam and elements, and
   (g) friction drag means engaging said elements imposing a frictional drag on said elements resisting rotation thereof about said given axis whereby radial positioning of said elements by said cam is insured.

4. An overrunning clutch assembly comprising, in combination,
   (a) a rotatable drive member adapted to rotate about a given axis,
   (b) a drum having an internal cylindrical surface,
   (c) means rotatably supporting said drum for rotation about said given axis,
   (d) a noncylindrical cam mounted upon said drive member for rotation therewith and axially aligned with said drum cylindrical surface,
   (e) a pair of radially movable friction elements interposed between said cam and said drum cylindrical surface, said elements being related in diametrical opposition with respect to each other and said cam, cylindrical segment surfaces defined on said elements adapted to selectively, frictionally engage said drum cylindrical surface,
   (f) a cam surface defined on each of said elements engaged by said cam whereby relative rotational movement between said sam and said elements radially translates said elements,
   (g) drag means engaging said elements imposing a frictional drag on said elements resisting rotation thereof about said given axis whereby radial positioning of said elements by said cam is insured, said drag means including an annular member having a cylindrical surface defined thereon,
   (h) means stationarily supporting said annular member concentric to said given axis,
   (i) a plurality of friction-producing segments within said annular member engaging said member cylindrical surface,
   (j) spring means biasing said segments into frictional engagement with said member cylindrical surface, and
   (k) means interconnecting said segments to said elements for rotation therewith.

5. An overrunning clutch assembly comprising, in combination,
   (a) a rotatable drive member adapted to rotate about a given axis,
   (b) a drum having an internal cylindrical surface, (c) means rotatably supporting said drum for rotation about said given axis,
(d) a noncylindrical cam mounted upon said drive member for rotation therewith and axially aligned with said drum cylindrical surface,
(e) a pair of radially movable friction elements interposed between said cam and said drum cylindrical surface, said elements being related in diametrical opposition with respect to each other and said cam, cylindrical segment surfaces defined on said elements adapted to selectively, frictionally engage said drum cylindrical surface,
(f) a cam surface defined on each of said elements engaged by said cam whereby relative rotational movement between said cam and said elements radially translates said elements,
(g) radially movable drag means connected to said friction elements for rotation therewith about said given axis,
(h) a cylindrical drag means engaging member concentrically related to said given axis and fixed relative thereto, said member being radially disposed inwardly of said drag means relative to said given axis, and
(i) spring means inwardly, radially biasing said drag means into frictional engagement with said cylindrical drag means engaging member whereby centrifugal forces acting upon said drag means during rotation of said friction elements tend to counteract said spring means for reducing the frictional engagement of said drag means with said drag means engaging member.

References Cited by the Examiner
UNITED STATES PATENTS

| | | | |
|---|---|---|---|
| 859,945 | 7/1907 | Jeffery | 192—58 |
| 2,373,462 | 4/1945 | Crow | 192—41 |
| 3,078,972 | 2/1963 | Davis et al. | 192—35 |

FOREIGN PATENTS 343,826  10/1904  France.

DAVID J. WILLIAMOWSKY, *Primary Examiner.*